Patented May 20, 1924.

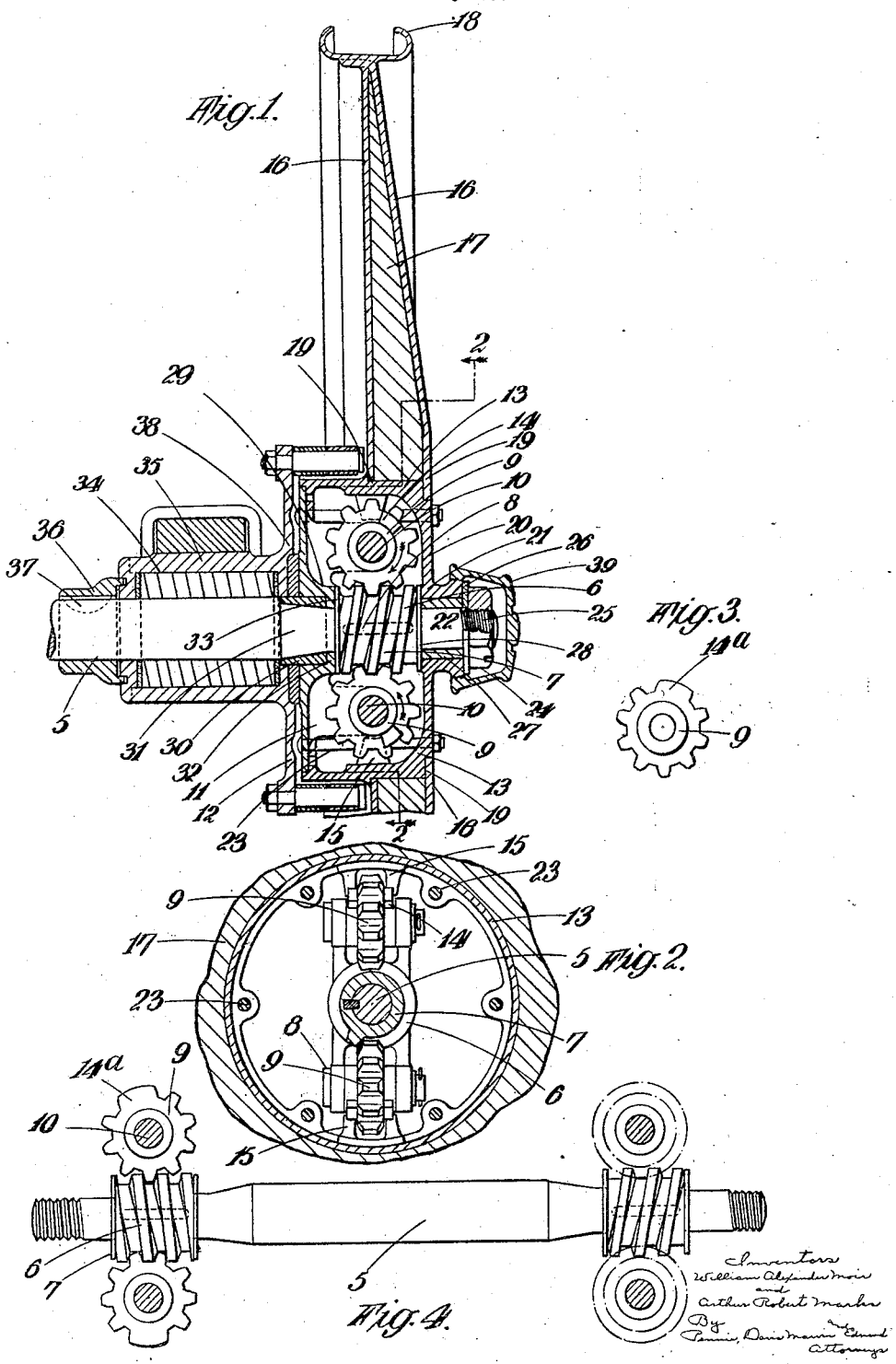

1,494,560

UNITED STATES PATENT OFFICE.

WILLIAM ALEXANDER MOIR, OF BURWOOD, NEAR SYDNEY, AND ARTHUR ROBERT MARKS, OF STRATHFIELD, NEAR SYDNEY, NEW SOUTH WALES, AUSTRALIA.

DIFFERENTIAL GEAR.

Application filed July 20, 1923. Serial No. 652,690.

*To all whom it may concern:*

Be it known that we, WILLIAM ALEXANDER MOIR and ARTHUR ROBERT MARKS, both subjects of the King of Great Britain, residing, respectively, at 67 Liverpool Road, Burwood, near Sydney, New South Wales, Australia, and Angel Road, Strathfield, near Sydney, New South Wales, Australia, have invented certain new and useful Improvements in or Relating to Differential Gears, of which the following is a specification.

This invention has reference to differential gear capable of being used in connection with road and similar vehicles as well as agricultural machines to permit the road wheels to rotate relatively to each other the differential gear being of the kind comprising a spiral or screw thread in the form of a worm engaging with the teeth of pinions or worm wheels suitably supported relatively to the worm for that purpose.

The axle according to this invention is made in one piece being continuous from each road wheel end and so provided with a plurality of differential gears of the kind referred to as to enable the road wheels of the vehicle to be differentially rotated for permitting the vehicle to traverse a curved path and at the same time considerably reduce the cost as compared with differential gear used in connection with a divided axle and eliminate the disadvantages due to the employment of free wheel clutch devices which are not silent in operation and are not generally serviceable in the same manner as is the case with differential gears used in connection with the road wheels of vehicles.

For the purposes of this invention the one piece axle is provided at or near each end with the worm and the road wheels of the vehicle are provided with the toothed or worm wheels for engagement with the said worm, the toothed or worm wheels being so constructed or fitted with members or devices such as lugs or their equivalents as to prevent by engagement with suitable abutments or the threads of the worms more than a predetermined angular rotation of the said worm wheels in opposite directions according to whether a negative or positive action takes place relatively to the road wheels. Preferably the members or their equivalents and the abutments are respectively so arranged on the toothed or worm wheels and the road wheels as to permit approximately a complete rotation of the toothed or worm wheels in either direction, the members or their equivalents being so disposed relatively to the abutments as to check the rotation of the toothed or worm wheels after the predetermined angular movements thereof have taken place. When the check is in operation the road wheel with which it is associated is locked to the axle through the toothed or worm wheel and the worm on the axle. Upon the road wheel tending to overrun the axle the toothed or worm wheel rotates in a reverse direction. The worm on the axle is preferably so constructed as to enable it to make several complete rotations for one rotation of the toothed or worm wheel or wheels and thus the road wheel is permitted to overrun the axle several complete turns before the check comes into operation thereby permitting the vehicle to traverse a curved path of more than a complete circle.

Each road wheel is so fitted with the toothed or worm wheels as to provide a balanced and symmetrical arrangement capable of equally distributing the stress due thereto.

In order that the said invention may be clearly understood and readily carried into effect the same will now be described more fully with reference to the accompanying drawings, in which:—

Figure 1 is a sectional elevation of part of a road wheel constructed according to this invention.

Figure 2 is a sectional view taken on the line 2—2 of Figure 1.

Figure 3 is a detail view of an alternative construction of the toothed or worm wheel.

Figure 4 is an illustration of a complete axle with a differential gear at each end.

The axle 5 which is in one piece as shewn more particularly in Figure 4 is provided near each end with a worm 6 formed on the outer surfaces of sleeves 7 secured to the axle 5 by keys 8. The worm wheels designated 9 are mounted on pins 10 secured in a housing 11 attached to a back plate 12 closing the inner end of a box or casing 13 with which each road wheel is provided, each box or casing 13 enclosing the worm and worm wheels connected with each road wheel. On each side of each worm wheel 9 is provided a lug 14 projecting therefrom, each lug 14 being so arranged as to engage with a fixed abutment 15 formed integrally with or attached to its respective housing or box. Alternatively the worm wheels may be made as shewn in Figure 3 with the space between two adjacent teeth filled in as at 14ᵃ for engagement with the thread of its respective worm for locking the road wheel to the axle or the pins 10 supporting the worm wheels may rotate therewith and be provided with arms or projections so arranged as to be capable of engaging with extensions on the said housings or boxes. Thus arranged the drive from the axle 5 is transmitted to the road wheels through the worm wheels 9 the lugs 14 and the abutments 15. Should the lugs 14 be out of contact with the abutments 15 the rotation of the axle 5 has for effect to rotate the worm wheels 9 until engagement between the lugs 14 and abutments 15 take place. When such engagement takes place the road wheel is locked to the axle and rotates therewith. When one road wheel rotates at a greater angular velocity than the other on the same axle such as takes place when turning a corner or travelling over a curved path, the inner road wheel turns at a slower angular velocity than the outer road wheel and takes the whole of drive from the axle whilst the outer road wheel overruns the axle and causes the worm wheels corresponding therewith to rotate. The extent of this differential movement is not generally very considerable in ordinary driving practice and thus the worm wheels connected with the outer road wheel are only caused to rotate a part of a complete revolution in negotiating practically all road routes. Upon the track or route becoming straight the free worm wheels are rotated in a reverse direction and the lugs 14 thereof brought into engagement with the abutments 15 and a locked drive of each road wheel with the axle is again established.

The road wheels each comprise two discs or plates 16 arranged on opposite sides of a wood packing or filling 17 and provided on the outer peripheries with a wheel rim 18. The said discs or plates 16 of each road wheel have central apertures in which are fitted one of the said boxes or casings 13, the margins of the apertures engaging with annular shouldered portions 19 provided on the said boxes. Each wheel box is of circular shape closed at its outer end by an integral outer plate 20 formed with a hollow boss 21 for receiving and fitting on to a portion 22 near the end of the axle. The inner end of each box of each road wheel is fitted with one of the aforesaid back plates 12 for enclosing the differential gear. Each back plate 12 is secured in position by axially arranged bolts 23 extending therethrough and through the said outer plate 20. The road wheels are secured in position by nuts 24 engaging with screw threaded terminal ends 25 of the axle 5. Each nut 25 bears against a washer 26 disposed between it and the outer end of the corresponding hollow boss 21 with which each of the before mentioned outer plates 22 are provided a liner 27 being arranged between each of the said hollow bosses 21, and the portions 22 of the axle 5. Between the inner ends of the said hollow bosses 21 and the outer ends of the respective sleeves 7 provided with the worms 6 is arranged a washer 28. Each of the aforesaid back plates 12 is also provided with a hollow inwardly flanged boss 29 which is arranged on a corresponding liner 30, disposed on a tapered portion 31 provided near each end of the axle such tapered portions being disposed between the main portion of the axle and those parts bearing the worm sleeves. Between the inner end of each worm sleeve 7 and the inward flanges 32 on the aforesaid hollow bosses 29 are arranged washers 33 whilst the said inwardly extending flanges 32 extend over and enclose the outer ends of the liners 30 surrounded by the said hollow bosses 21. The axle 5 is fitted at each end with a spring pad 34 for securing suspension springs of the vehicle in position, each such pad 34 being also fitted with roller bearings 35 arranged around the axle. The said parts 34 are secured in position by collars 36 locked to the axle by keys 37. Arms 38 are provided on each spring pad 34 for carrying a band brake mechanism. The hollow boss 21 on the outer plate 20 of each wheel box is fitted with a cap 39 for enclosing the terminal end of the axle and nut attached thereto.

By thus constructing the road wheels the boxes or casings constituting the hubs thereof are capable of forming a part of the differential gearing, the boxes or casings serving to contain and enclose the gears at each end of the one piece axle as well as to support the worm wheels in position relatively to the worms secured to the axle and enable the drive of the axle to be directly imparted to each road wheel. The arrangement of parts also facilitates the assembling of the road wheels on the axle as well as the removal thereof the worm wheels being adapted to rotate into and out of engagement with the worms during such assembling or removal. Further the employment of a one piece axle and in conjunction with road wheels comprising differential gearing as hereinbefore described also facilitates the mounting of the suspension springs and brake mechanism in close proximity to the road wheels.

What we claim and desire to secure by Letters Patent of the United States is:—

1. Differential gear for road and similar vehicles, comprising a one piece axle having thereon a plurality of worms in the form of screw threads and toothed worm wheels capable of limited angular rotation relatively to the axle and supported independently of the one piece axle with their teeth in engagement with the screw threads of the said worms, for the purpose specified.

2. Differential gear for road and similar vehicles, comprising a one piece axle with worms in the form of screw threads thereon, toothed worm wheels capable of rotating relatively to the axle and arranged with their teeth in engagement with the screw threads of the said worms, and devices for regulating the extent of rotation of the worm wheels relatively to the said axle, for the purpose specified.

3. Differential gear for road and similar vehicles, comprising a one piece axle, road wheels mounted on the ends thereof, worms in the form of screw threads on the one piece axle, toothed worm wheels carried by the road wheels and arranged with their teeth in engagement with the worms, and devices for regulating the extent of rotation of the toothed worm wheels relatively to the one piece axle and road wheels, for the purpose specified.

4. Differential gear for road and similar vehicles, comprising a one piece axle, sleeves mounted thereon and provided with worms in the form of screw threads, toothed worm wheels supported with their teeth in engagement with the screw threads of the said worms and devices for regulating the extent of angular rotation of the worm wheels about their axes, for the purpose specified.

5. Differential gear for road and similar vehicles, comprising a one piece axle, worms in the form of screw threads provided thereon, toothed worm wheels arranged with their teeth in engagement with the screw threads of the said worms, devices for regulating the extent of angular rotation of the worm wheels about their axes and boxes enclosing the worms and worm wheels, said boxes supporting the worm wheels in position relatively to the worms.

6. Differential gear for road and similar vehicles, comprising a one piece axle, worms in the form of screw threads thereon, toothed worm wheels arranged with their teeth in engagement with the said worms, boxes enclosing the worms and worm wheels, housings in the boxes for supporting the worm wheels in position, road wheels for supporting the boxes and devices embodying parts connected with the worm wheels and parts independent of the worm wheels for regulating the angular rotation of the said worm wheels, for the purpose specified.

7. Differential gear for road and similar vehicles, comprising a one piece axle, worms in the form of screw threads thereon, toothed worm wheels arranged with their teeth in engagement with the said worms, boxes enclosing the worms and worm wheels and supporting the worm wheels relatively to the said worms, road wheels to which the boxes are attached, abutments on the said boxes and devices connected with the worm wheels for regulating the angular rotation of the worm wheels by engagement with the abutments, for the purpose specified.

8. Differential gear for road and similar vehicles, comprising a one piece axle, worms in the form of screw threads thereon, toothed worm wheels arranged with their teeth in engagement with the said worms, boxes having back plates secured in position by bolts such boxes enclosing the worms and worm wheels, housings attached to the boxes and supporting the worm wheels in position, lugs on the worm wheels, abutments provided on the housings for the lugs to engage with for regulating the extent of the angular rotation of the worm wheels and road wheels to which the boxes are attached, for the purpose specified.

WILLIAM ALEXANDER MOIR.
ARTHUR ROBERT MARKS.